March 25, 1958     M. LATAPIE     2,828,481
DEVICE FOR CONTROLLING THE CORRESPONDENCE OF THE
POSITIONS OF TWO MOVABLE MEMBERS IN
RELATION TO STATIONARY MEMBERS Filed Aug. 16, 1954     4 Sheets-Sheet 1

INVENTOR:
MARCEL LATAPIE
By
ATTORNEY

INVENTOR
MARCEL LATAPIE
By
ATTORNEY

March 25, 1958　　　M. LATAPIE　　　2,828,481
DEVICE FOR CONTROLLING THE CORRESPONDENCE OF THE
POSITIONS OF TWO MOVABLE MEMBERS IN
RELATION TO STATIONARY MEMBERS
Filed Aug. 16, 1954　　　　　　　　　4 Sheets-Sheet 3

INVENTOR:
MARCEL LATAPIE
By
ATTORNEY

United States Patent Office 2,828,481
Patented Mar. 25, 1958

2,828,481

DEVICE FOR CONTROLLING THE CORRESPONDENCE OF THE POSITIONS OF TWO MOVABLE MEMBERS IN RELATION TO STATIONARY MEMBERS

Marcel Lataple, Paris, France, assignor to Saint-Chamond-Granat, Paris, France, a French company Application August 16, 1954, Serial No. 449,867

Claims priority, application France August 19, 1953

15 Claims. (Cl. 340—268)

This invention relates to devices for verifying that the positions of two movable members placed at a certain distance from each other are in corresponding positions in relation to stationary members and more particularly to devices used in the case of batteries of coke ovens placed side by side where before proceeding to empty the ovens the machinist driving the coke pusher must be able to make sure that he is placed in front of the door of an oven the other door of which has just been removed by the "coke guide" operator. In this case the controlling device must be associated with a "go-ahead" device enabling the operator of one of the movable members to transmit a signal to the operator of the other movable member, informing him that he is in the correct position, which will only be when the controlling device gives the assurance of corresponding positions; a "safety" device being moreover advantageously provided to keep all the driving controls locked to one or the other movable member until correspondence has been signalled by the controlling device.

The devices according to the invention comprise control circuits having resistances in series corresponding to the stationary members and constituting the branches of Wheatstone bridges with which are associated sensitive relays so arranged as to close contacts when said bridges are in equilibrium.

An object of the invention is to conciliate considerations of capacity and of reliable operation, and for this purpose it provides for a number of control circuits of the type specified, the sensitive relay contacts of which are arranged in series in the "go-ahead" circuit, each of said circuits controlling the unit digit of a given order of the identification number of the position of the stationary members; any system of notation can be used.

Assuming, for instance, that the system of notation adopted be the decimal system: using two circuits of the type mentioned, each comprising at most ten different resistance values and respectively controlling the units digit and the tens digit of the position identification number, it is possible to obtain an overall circuit of a global capacity of 100 positions. Likewise, a group of three circuits of this type would provide a capacity of 1000 positions, and so on.

Further objects and advantages of the present invention will be apparent from the following description, reference being had to the accompanying drawings, wherein preferred embodiments of the invention are clearly shown.

Figure 1:
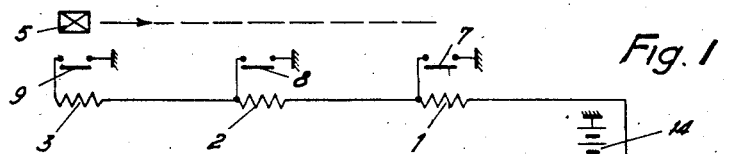
Fig. 1 is a diagrammatic view of one of the embodiments of the control circuit according to the invention.

To make the following description more readily understandable, it will be assumed that the position controlling devices described and shown on the drawing refer to a coke pusher and a coke guide moving along the front of a battery of coke ovens; but it is obvious that that these devices could be equally well applied to any other group of two movable members whose corresponding positioning is to be controlled in relation to a given set of stationary members and certain operations of which must not be possible in the absence of the said correspondence.

In the specimen embodiment shown in Fig. 1, two sets of equal resistances 1, 2, 3 . . . and 1', 2', 3' . . . are mounted in series opposite each of the ovens along the line of travel of the moving trucks 5 and 6 of the coke guide and the coke pusher. Switches 7, 8, 9 . . . and 7', 8', 9' . . . respectively are provided in fixed positions in association with each resistance, each of these switches permitting of short-circuiting the series of resistances following that with which it is associated. Thus, the switch 7 short-circuits the series of resistances 2, 3 . . . To the respective ends of each of the re-resistance circuits 1, 2, 3 . . . and 1', 2', 3' . . . is connected the saturation winding 11 of a saturable self-induction coil 12 with 2 control windings 13, the said saturation winding being connected by its central point to one of the terminals of a direct current source 14, the other terminal of which is earthed. The alternating current winding 13 of the self-induction coil is put in series with a suitably calculated resistance 15 and a source of alternating current 16. A bridge rectifier 17 is connected to the terminals of the said winding 13; this bridge rectifier feeds a relay 18 which operates the control contact 19 mounted in series in an indicator or "go ahead" circuit.

When the two trucks 5 and 6 occupy homologous positions on either side of the ovens, say for instance, respectively opposite the members corresponding to the resistances 2 and 2', the control components of the contacts which are on the said trucks and consist, for instance, of magnetic pedals of the type described later with reference to Figs. 5 and 6, cause the corresponding contacts 8, 8' to close and bring about the short-circuiting of resistances 3, 4 . . . and 3', 4' . . . which follow resistances 2 and 2', therefore of the same number of resistances on each branch, so that the bridge constituted by these resistances is equilibrated, whilst in the absence of this concordance the bridge remains continuously out of equilibrium.

When equilibrium is ensured, and only then, the continuous flux in the self-induction coil 11—13 is nil, the impedance in the windings 13 is high in relation to the resistance 15 in series, the whole alternating voltage supplied by the source 16 is at the terminals of the rectifier 17, the relay 18 functions and the contact 19 sticks.

If the branches of the bridge are in slight disequilibrium the impedance of the self-induction coil 13 becomes weak in relation to the resistance 15, the voltage at the terminals of the relay 18 falls to a value in the neighbourhood of zero, the relay and its contact 19 are released.

Figure 2:
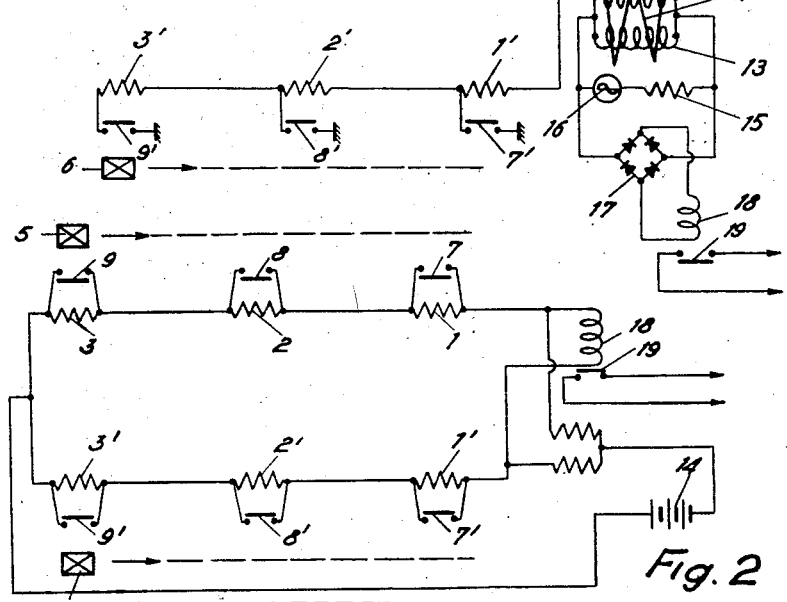
Fig. 2 is a diagrammatic view of another embodiment of the control circuit.

In the example shown in Fig. 2, where the same reference figures correspond to elements similar to those in Fig. 1, the relay 18 is mounted on the diagonal of a bridge with a direct current supply 14 on two branches of which the control resistances 1, 2, 3 . . . and 1', 2', 3' . . . are mounted in series. The contacts 7, 8, 9 . . . and 7', 8', 9' . . . are so mounted as to short-circuit respectively the resistances 1, 2, 3 . . . and 1', 2', 3' . . . with which they are connected and which are equal per pair but different in each pair, so that it is only when the trucks 5 and 6 are opposite two resistances of one and the same pair that the bridge is equilibrated; then, and then only, the relay 18 ceases to be under current and the contact 19 is closed.

Figure 6:
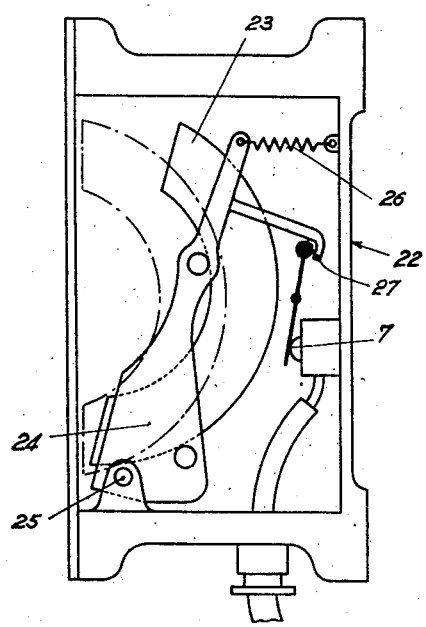
Fig. 6 is a diagrammatic view on a larger scale of the stationary member of the driving gear according to Fig. 4.
Figure 5:
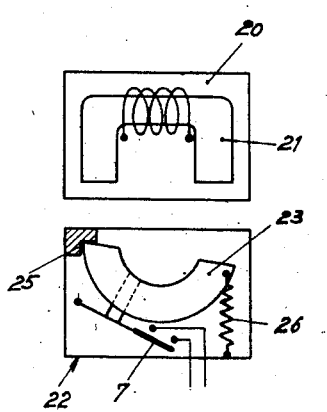
Fig. 5 is a diagrammatic view of a magnetic device operating the equilibrium contacts of the control circuit.

Contacts 7, 8, 9 . . . and 7', 8', 9' . . . are operated according to the specimen embodiment shown in Figs. 5 and 6, by magnetic pedals 20 mounted on each of the trucks 5 and 6 and constituted by an electro-magnet 21. These pedals 20 cause magnetic levers 22 to oscillate when they are opposite them. These levers 22 are constituted by a permanent magnet 23, mounted between two guide plates 24, swivelling round an axis 25; in its rotation it closes one of the contacts 7, 8, 9 . . . or 7', 8', 9'. . . . The magnet 23 is flexibly returned to its position by a spring 26 and the swivelling contact 7 is operated, in the specimen embodiment shown in Fig. 6, by means of lugs 27.

The control equipment comprises essentially in the coke guide: a push button 28 and a pilot lamp 29; in the pusher: a pilot lamp 30 and an unlocking relay 31. A trolley line 32, 32' is provided between the trucks 5 and 6 for setting up the "go ahead" circuit, comprising in addition to contact 19 of the control circuit, a self-excitation relay 33 and double contact 34, 35.

Figure 7:
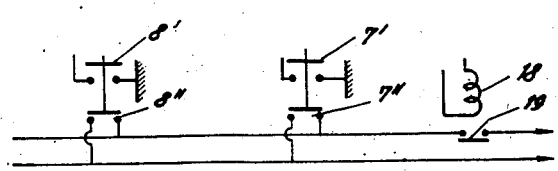
Fig. 7 is a diagrammatic view of an alternative form of the control circuit with duplicate position correspondence contacts.

In the alternative embodiment shown in Fig. 7 of the equipment represented on Fig. 1, each of the contacts 7', 8' . . . is duplicated by an additional contact 7", 8". . . . These contacts 7", 8" . . . are parallel mounted and inserted in the "go ahead" circuit controlled by the contact 19 of relay 18. It will be seen that in this case, if none of the contacts 7', 8' . . . is closed, even if none of the homologous contacts 7, 8 . . . is closed either, the "go head" circuit remains open although the bridge is in equilibrium and contact 19 is closed.

Figure 3:
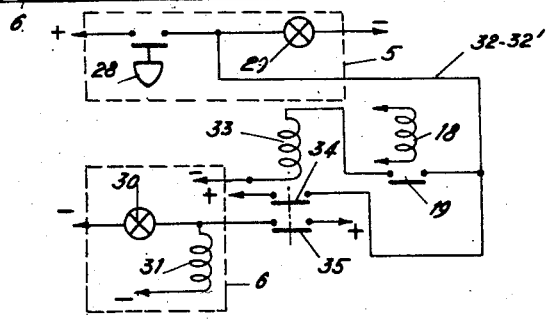
Fig. 3 is a diagrammatic view of an embodiment of a "go ahead" and safety circuit according to the invention.

A diagram showing the principle of the "go ahead" circuit is given in Fig. 3. As can be seen on this diagram, when the coke guide 5 is in position and the operator has effected the preliminary operation of removal of the oven door, he presses on the push button 28, its pilot lamp 29 lights up, but goes out again as soon as he stops pressing on button 28 if the pusher 6 is not in position, since the control contact has remained open.

If, on the contrary, the pusher 6 is in position the contact 19 is closed. So soon as the operator of the coke-guide 5 presses on the button 28 the lamp 29 lights up, but at the same time the relay 33 is excited; the contacts 34 and 35 close; the relay 33 remains excited and the contacts 34 and 35 remain closed: the lamp 30 of the pusher also lights up and the lamp 29 remains lighted even when the operator of the coke guide ceases to press on the button 28. The two operators are thus warned that the operation of emptying the oven can be effected, and at the same time the relay 31 becomes excited and releases the control of the coke-pusher cake.

This device ensures a very high degree of safety since it requires both correspondence in position of the two trucks 5 and 6 and voluntary authorization of the operation by the machinist running the coke guide 5. In other words, even if the two trucks are opposite each other the pusher cannot operate unless it is permitted to do so by the coke guide.

Figure 4:
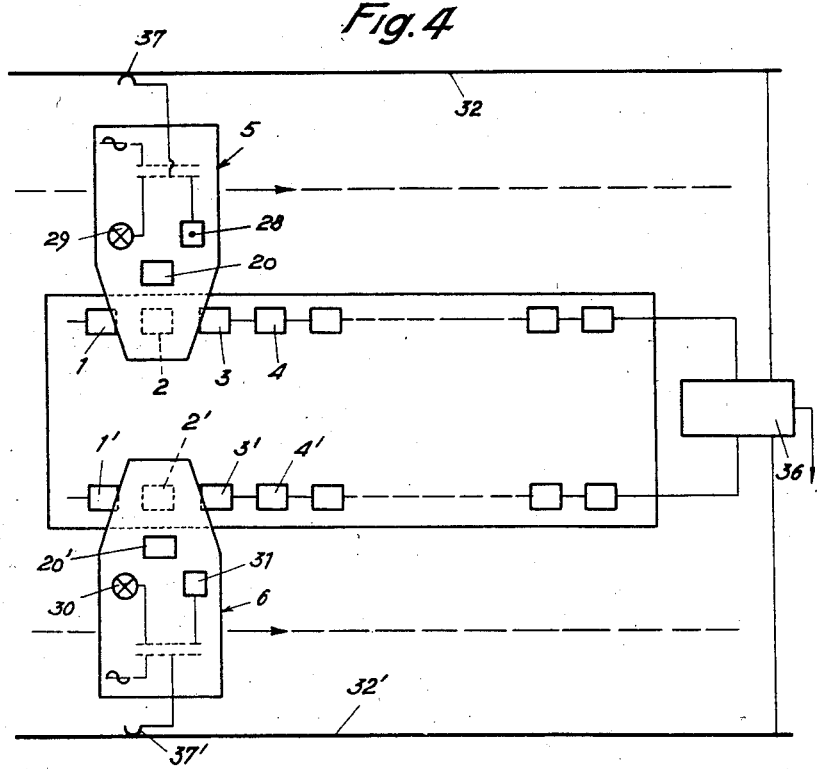
Fig. 4 is an installation diagram for the control system according to the invention.

Fig. 4 gives an installation diagram of the control equipment completed by the "go ahead" equipment. It shows the two series of resistances 1, 2, 3, 4 . . . and 1', 2', 3', 4' . . . arranged along the line of travel of the moving trucks 5 and 6 opposite each of the ovens and each contained in a watertight cabinet inside which is also the corresponding switch 7, 8 . . ., 7', 8' . . . in-tegral with the magnetic lever 23. On each of the trucks 5 and 6 are mounted, on the one hand, magnetic pedals 20, 20' ensuring when they pass in front of the various cabinets 1, 2, 3 . . ., 1', 2', 3' . . . the operation of the contacts 7, 8 . . ., 7', 8' . . . equilibrating the bridge, and on the other hand the push button 28, the pilot lamp 29 and the lamp 30, and the release relay 31, respectively.

A watertight cabinet 36 comprises the various control organs, in particular the sensitive relay 18 and its contact 19 of the control circuit and the self-excitation double contact relay 33 of the "go ahead" circuit of the operation. A contact 37, 37' per truck 5 and 6 ensures establishment of the "go ahead" circuit by the trolley lines 32, 32' connected to the cabinet 36.

In order that the devices of the type just described operate absolutely reliably, on the one hand, the detecting device must be simple and stable, therefore comparatively unsensitive; on the other hand, the tolerances on values of the resistances composing the bridge must not be too close, so that any normal variations of these values liable to occur in time shall not cause any disturbance in the operation of the device.

On account of these considerations, fairly great variations in voltage at the control circuit terminals must be provided for when passing from one bridge contact to the following one; these variations should preferably be regular so as to obtain practically constant sensitivity.

To meet these requirements, calculations show that the value of the resistances must increase very rapidly. Now, the values of the resistances to be used must, in practice, be comprised within certain limits. In fact, at the lower limit they must not fall below a value definitely higher than that of a contact resistance and at the higher limit they must remain definitely below the insulation resistance value. The number of resistances in each branch of the bridge is therefore limited and, consequently, the number of pairs of members whose correspondence of positions is to be controlled, i. e. the capacity of the device, is also limited.

To conciliate considerations of capacity and of reliability, the invention provides for a number of control circuits of the type specified, each of said circuits controlling the unit digit of a given order of the identification number of the position of the stationary members, any system of notation can be used.

Figure 8:
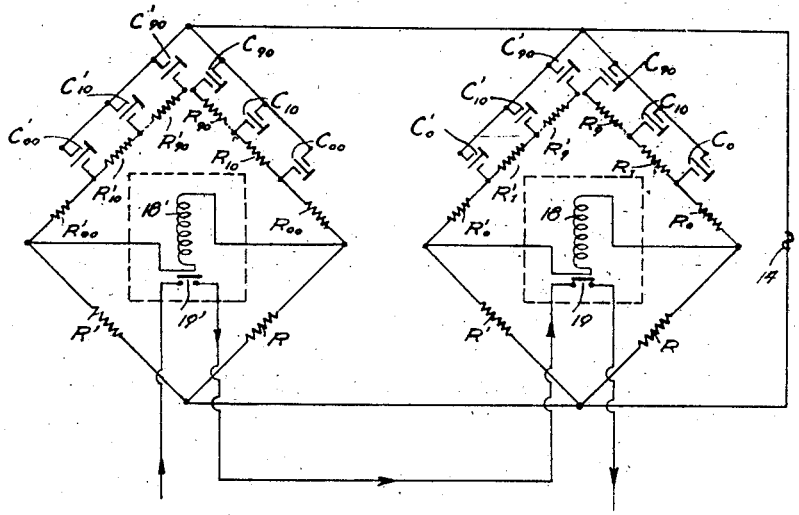
Figs. 8, 9 and 10 are wiring diagrams for the double bridge control circuit.
Figure 10:
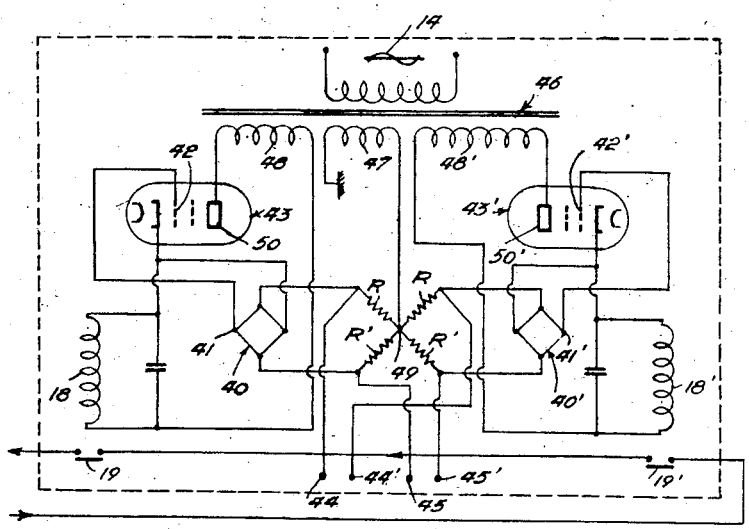
Figure 9:
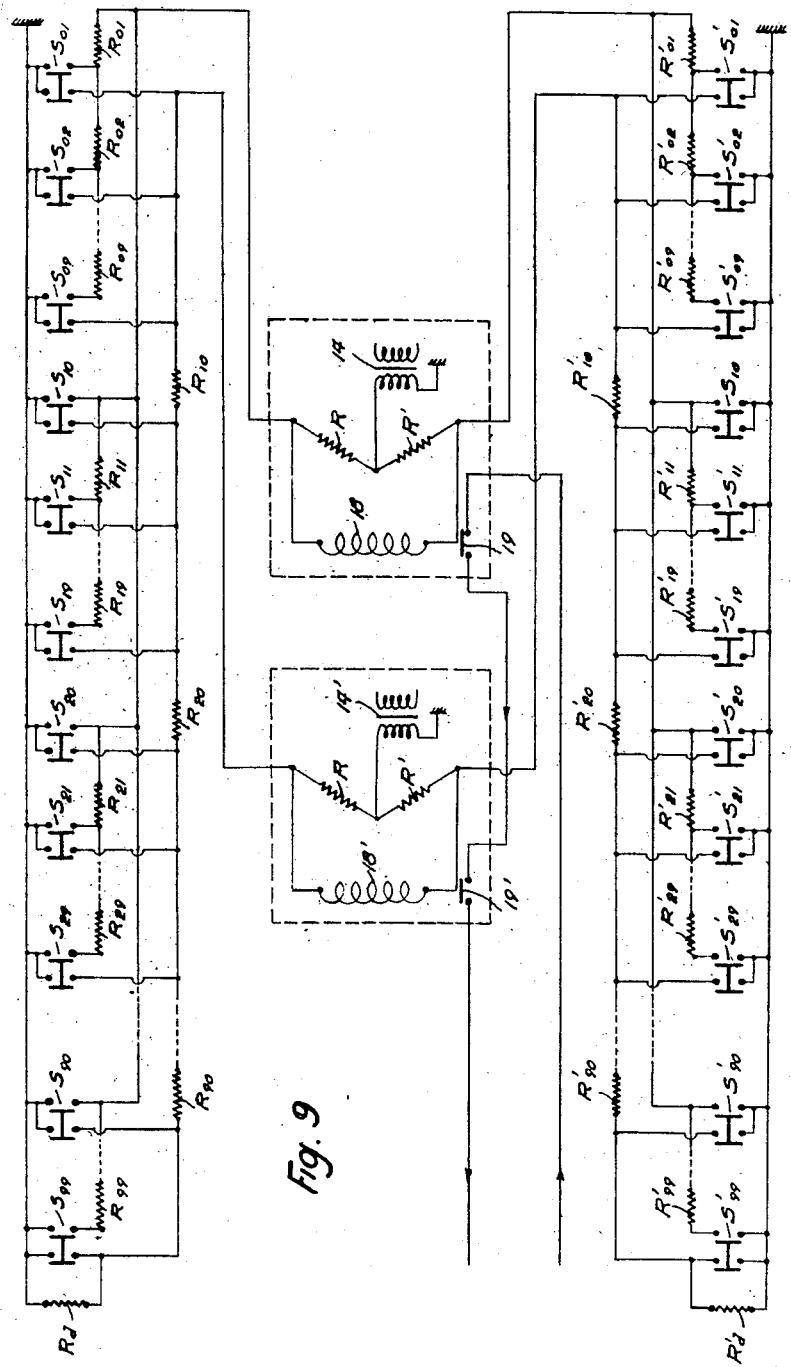

In the diagrams shown on Figs. 8, 9 and 10, a double bridge is provided for the control of the units and of the tens digits respectively.

In the wiring and assembly diagram shown in Fig. 8, the control circuits of the units and tens are identical and are each constituted by a Wheatstone bridge of which two branches are formed by two equal resistances $R$, $R'$ and the two others by ten resistances in series $R_0$, $R_1$, $R_2$ . . . $R_9$ and $R'_0$, $R'_1$, $R'_2$ . . . $R'_9$ for the units bridge, equal respectively to the former and capable of being placed successively in series in the corresponding branches by the contacts $C_0$, $C_1$ . . . $C_9$ and $C'_0$, $C'_1$ . . . $C'_9$, and by ten resistances in series $R_{00}$, $R_{10}$ . . . $R_{90}$ and $R'_{00}$, $R'_{10}$ . . . $R'_{90}$ for the tens bridge, said resistances being placed successively in series by the contacts $C_{00}$, $C_{10}$ . . . $C_{90}$ and $C'_{00}$, $C'_{10}$ . . . $C'_{90}$. In the diagonals of each of the bridges are inserted respectively coils 18, 18' of sensitive relays operating contacts 19, 19' respectively. These control contacts 19, 19' are mounted in series in one and the same indicator or "go ahead" circuit. Both bridges are fed by the same source of current 14.

When the two trucks or movable members which it is desired to place in corresponding positions are in homologous positions on either side of the ovens or stationary members, for instance when these trucks are respectively in front of the homologous members bearing the No. 21, the control organs of the contacts which are on the said trucks and are, for instance, magnetic pedals of the type described above, cause the contacts corresponding to $C_1$, $C'_1$ of the first bridge, and to $C_2$, $C'_2$ of the second bridge to close, and consequently introduce into the homologous branches of the first bridge the two series of equal resistances $R_0$, $R_1$ and $R'_0$, $R'_1$ and in the homologous branches of the second bridge the two series of equal resistances $R_{00}$, $R_{10}$, $R_{20}$ and $R'_{00}$, $R'_{10}$, $R'_{20}$. The two bridges are equilibrated and the contacts 19, 19' operated by the relays 18, 18' stick. The "go ahead" circuit closes, and can only close if the two bridges are in equilibrium, that is to say, if the movable members occupy corresponding positions in relation to the stationary members.

As is seen, the control equipment for 99 ovens that is to say, corresponding to 99 positions of the movable members in relation to the stationary members, has been made here with only 9 different types of increasing resistances, and the amperage variations of the current flowing through the control windings may be fairly high and should preferably be equal when passing from one contact to the next following contact.

The diagram shown in Fig. 9 provides 10 identical groups of increasing resistances in series, $R_{01}$ to $R_{09}$, $R_{11}$ to $R_{19}$ ... and $R_{91}$ to $R_{99}$ for one of the branches of the Wheatstone bridge of the units, and 10 similar groups, $R'_{01}$ to $R'_{09}$, $R'_{11}$ to $R'_{19}$ ... and $R'_{91}$ to $R'_{99}$ for the other branch, these groups of resistances in series all being connected to an apex of the bridge and capable of being substituted for each other according to the tens digit of the position identification number of the stationary members. In this instance, it is the earth connection which constitutes one of the apices of the bridge.

The bridge of the tens digits comprises two groups of 9 resistances in series, $R_{10}$, $R_{20}$ ... $R_{90}$ and $R'_{10}$, $R'_{20}$ ... $R'_{90}$, the said resistances increasing and being equal two by two on each branch.

As in the specimen embodiment shown in Fig. 8, the sensitive relay coils 18, 18' operating the contacts 19, 19' respectively are inserted in the diagonals of these two bridges respectively. The control contacts 19, 19' are mounted in series in one and the same indicator circuit. The two bridges are supplied with current by the two transformers 14, 14'.

Associated with the ovens or stationary members to be controlled are double switches $S_{01}$, $S_{02}$ ... $S_{99}$, $S'_{01}$, $S'_{02}$ ... $S'_{99}$, each of them simultaneously closing a contact of the units bridge and a contact of the tens bridge.

Thus, closing the homologous double switches $S_{21}$, $S'_{21}$ introduces the equal resistances $R_{21}$ and $R'_{21}$ into the homologous branches of the first bridge, and the two series of equal resistances $R_{10}$, $R_{20}$ and $R'_{10}$ and $R'_{20}$ into the homologous branches of the second bridge. The two bridges are then equilibrated and the contacts 19, 19' stick. The "go ahead" circuit is closed.

Here again, the control equipment for 99 ovens necessitates only 9 different types of increasing resistances because it has been possible to adopt:

$$R_{01}=R_{11}=R_{21}= \ldots =R_{91}=R_{10}$$
$$R_{02}=R_{12}=R_{22}= \ldots =R_{92}=R_{20}$$
$$R_{09}=R_{19}=R_{29}= \ldots =R_{99}=R_{90}$$

In this embodiment two resistances $R_d$, $R_{d'}$ of inequal value have been inserted at the terminal of each branch of the bridge. These resistances create a permanent disequilibrium which disappears when a contact is actuated by the movable members.

It goes without saying that any amplifier device capable of operating the sensitive relay 19 can be mounted in the diagonal of each of the bridges, units and tens. A description has already been given of a magnetic amplifying device with saturable self-induction coil.

In the specimen embodiment shown in Fig. 10, the relays 18, 18' operating the control contacts 19, 19' are actuated by an electronic device.

In the diagonals of the two Wheatstone bridges, units and tens are inserted bridge cells 40, 40', the outgoing negative poles of which, 41 and 41', supply the grids 42, 42' of thyratrons 43, 43'. The branches carrying the resistances in series of the units bridge are connected at 44, 45 with the ends of the resistances R, R' of this bridge and the branches of the tens bridge are connected at 44', 45' with the ends of the resistances R, R' of this second bridge. The transformer 46, the primary winding of which is connected to the terminals of an alternating current source 14, comprises a secondary with 3 windings 47, 48, 48'. The secondary winding 47, one end of which is earthed, is connected by the other end to the apex 49 of the branches R, R' common to the two bridges. The other branches of the bridges carrying the resistances in series are mounted in the same manner as those shown in Fig. 9. The windings 48 and 48' supply plates 50, 50' of the thyratrons 43 and 43' respectively.

If the bridges are out of equilibrium the negative voltage of the grids 42, 42' blocks the thyratrons 43, 43'. If the bridges are in equilibrium the grids are at zero potential, the thyratrons come into operation and supply the relay coils 18, 18', the closing contacts 19, 19' of which are placed in series in the "go ahead" circuit.

It goes without saying that the invention is in no way limited to the details of execution shown or described which have only been given by way of illustration. In particular, the equilibration contacts, instead of being actuated magnetically, could be actuated mechanically by means, for instance, of roller and rack; the electro of the magnetic pedal could be replaced by a permanent magnet or again by an ordinary magnetic mass acting on the permanent magnet 23. In the same way, the latter could be made of soft iron, actuated magnetically by the permanent magnet or the electro-magnet; the magnet of the magnetic lever could be replaced by a sliding instead of a swivelling magnet; the relays could be of the electronic type; the trolleys of the "go ahead" circuit of the movable trucks could be done away with by using high frequency carrier currents on the feeding line of the trucks; "go ahead" contacts and locking relays could be provided on both movable members; in each of the bridges each of the contacts could short-circuit one of the resistances instead of earthing a group of resistances in series; a single series of resistances corresponding to the units of the position identification number could be provided instead of a number of groups constituted by the same resistances; in each series of resistances the sequence of values need not be regular, as certain consecutive resistances could be of the same value; the amplifying device actuating the sensitive relays could be of any desired type.

What I claim is:

1. In an electrical device for controlling the correspondence of the positions of two movable members in relation to stationary members through a differential comparison set-up, said comparison set-up comprising a control circuit having resistances in series corresponding to said stationary members and constituting two of the branches of a Wheatstone bridge, a pilot relay inserted on the diagonal of said bridge, a control relay contact operated by said relay so as to be closed when said bridge is in equilibrium, a series of contacts mounted respectively on each of said stationary members and adapted to short-circuit said resistances in series, and means provided respectively on said movable members for operating said contacts of said stationary members when said two movable members are in front of said stationary members.

2. In a device as in claim 1 wherein said means for operating contacts of said stationary members are of the magnetic type.

3. In an electrical device for controlling the correspondence of the positions of two movable members in relation to stationary members through a differential comparison set-up, said comparison set-up comprising a control circuit having resistances in series corresponding to said stationary members and constituting two of the branches of a Wheatstone bridge, a pilot relay inserted on the diagonal of said bridge, a control relay contact operated by said relay so as to be closed when said bridge is in equilibrium, a series of contacts mounted respectively on each of said stationary members and adapted to short-circuit said resistances in series, a movable magnet fixed with each of said contacts of said stationary members and having one degree of freedom of movement, and a magnet mounted on each of said movable members and adapted to operate said movable magnet, when said movable members are in front of said stationary members.

4. In a device as in claim 1 wherein each of said contacts mounted on said stationary members is adapted to short-circuit one of said resistances of said control circuit.

5. In a device as in claim 1 wherein each of said contacts mounted on said stationary members is adapted to earth one of said resistances of said control circuit whereby short-circuiting the succeeding series of said resistances.

6. In a device as in claim 1 wherein said pilot relay comprises a coil directly mounted on the diagonal of said bridge.

7. In a device as in claim 1 which further comprises an amplification device for actuating said pilot relay inserted on the diagonal of said bridge.

8. In an electrical device for controlling the correspondence of the positions of two movable members in relation to stationary members through a differential comparison set-up, said comparison set-up comprising a control circuit having resistances in series corresponding to said stationary members and constituting two of the branches of a Wheatstone bridge, a saturable differentially wound self-induction coil, two windings mounted respectively on the other branches of said bridge and constituting the control windings of said saturable self-induction coil, a pilot relay controlled by said saturable self-induction coil, a control relay contact operated by said relay so as to be closed when said bridge is in equilibrium, a series of contacts mounted respectively on each of said stationary members and adapted to short-circuit said resistances in series, and means provided respectively on said movable members for operating said contacts of said stationary members when said two movable members are in front of said stationary members.

9. In an electrical device for controlling the correspondence of the positions of two movable members in relation to stationary members through a differential comparison set-up, said comparison set-up comprising a control circuit having resistances in series corresponding to said stationary members and constituting two of the branches of a Wheatstone bridge, a pilot relay inserted on the diagonal of said bridge, a control relay contact operated by said relay so as to be closed when said bridge is in equilibrium, a series of contacts mounted respectively on each of said stationary members and adapted to short-circuit said resistances in series, means provided respectively on said movable members for operating said contacts of said stationary members when said two movable members are in front of said stationary members, a self-excitation contact mounted on one of said movable members adapted to operate only after closure of said control relay contact, a "voluntary" contact mounted on the other of said movable members, whereby said self-excitation contact controls the permanent operation, on at least one of said two movable members of an indicator of the correspondence of positions of said movable members.

10. In a device as in claim 9 further comprising a locking relay adapted to lock the operative gears of said movable members.

11. In an electrical device for controlling the correspondence of the positions of two movable members in relation to stationary members through a differential comparison set-up, said comparison set-up comprising a control circuit having resistances in series corresponding to said stationary members and constituting two of the branches of a Wheatstone bridge, a pilot relay inserted on the diagonal of said bridge, a control relay contact operated by said relay so as to be closed when said bridge is in equilibrium, a series of contacts mounted respectively on each of said stationary members and adapted to short-circuit said resistances in series, means provided respectively on said movable members for operating said contacts of said stationary members when said two movable members are in front of said stationary members, a source of electric current, a "voluntary" contact on one of said movable members mounted in series with said control relay contact, a self-excitation double contact relay mounted at the terminals of said source of electric current, first indicator of positions correspondence mounted on said movable member at the terminals of said source of current and in series with said "voluntary" contact and with said self-excitation contact, a second indicator of positions correspondence and a locking relay mounted on the other of said movable members in series, at the terminals of said electric source, with the second contact of said self-excitation double contact relay.

12. In an electrical device for controlling the correspondence of the positions of two movable members in relation to two series of stationary members having each an identification member of position through a differential comparison set-up, said comparison set-up comprising an indicator or "go-ahead" circuit, a plurality of control circuits each controlling the unit digits of a given order of said identification numbers and each having resistances in series corresponding to said digits of identification numbers of said stationary members and constituting two of the branches of Wheatstone bridges, contacts mounted respectively on each of said stationary members and corresponding each to a digit of the respective order of said identification numbers and adapted to short-circuit said respective resistances in series, means provided respectively on said movable members for operating said contacts of said stationary members when said two movable members are in front of said stationary members, a plurality of control contacts corresponding respectively to said control circuits and mounted in series on said "go-ahead" circuit so as to shut said circuit when all operated, pilot relays adapted to operate respectively said control contacts and electrically connected to said Wheatstone bridges so as to operate said control contacts only when said corresponding Wheatstone bridges are in equilibrium, whereby controlling the correspondence of positions of two movable members in relation to two series of stationary members by means of a number of resistances and contacts much smaller than the number of stationary members.

13. In an electrical device as in claim 12 wherein the control circuit of the units of a certain order of said identification number of position comprises as many groups of resistances in identical series as there are digits of the immediately higher order in the said number.

14. In a device as in claim 12 wherein said means provided on said movable members for operating said contacts of said stationary members are of the magnetic type.

15. In an electrical device for controlling the correspondence of the positions of two movable members in relation to two series of stationary members having each an identification number of position through a differential comparison set-up, said comparison set-up comprising an indicator or "go-ahead" circuit, a plurality of control circuits each controlling the units digits of a given order of said identification numbers and each having resistances in series corresponding to said digits of identification numbers of said stationary members and constituting two of the branches of Wheatstone bridges, contacts mounted respectively on each of said stationary members and corresponding each to a digit of the respective order of said identification numbers and adapted to short-circuit said respective resistances in series, a movable magnet fixed with each of said contacts of said stationary members and having one degree of freedom of movement, and a magnet mounted on each of said movable members and adapted to operate said movable magnet when said movable members are in front of said stationary members, a plurality of control contacts corresponding respectively to said control circuits and mounted in series on said "go-ahead" circuit so as to shut said circuit when all operated, pilot relays adapted to operate respectively said control contacts and electrically connected to said Wheatstone bridges so as to operate said control contacts only when said corresponding Wheatstone bridges are in equilibrium, whereby controlling the correspondence of positions of two movable members in relation to two series of stationary members by means of a number of resistances and contacts much smaller than the number of stationary members.

References Cited in the file of this patent

UNITED STATES PATENTS

| | | |
|---|---|---|
| 2,177,850 | Vogt et al. | Oct. 31, 1939 |
| 2,421,944 | Hughes | June 10, 1947 |
| 2,456,499 | Fritzinger | Dec. 14, 1948 |
| 2,460,497 | Frisk et al. | Feb. 1, 1949 |
| 2,509,850 | Von Mulinen | May 30, 1950 |
| 2,584,897 | Marco | Feb. 5, 1952 |
| 2,730,707 | Habeerle et al. | Jan. 10, 1956 |

FOREIGN PATENTS

| | | |
|---|---|---|
| 651,346 | Great Britain | Mar. 14, 1951 |